(12) United States Patent
Broyles (10) Patent No.: US 9,102,042 B1
(45) Date of Patent: Aug. 11, 2015

(54) 18 WHEELER BRAKE SHOE TOOL SYSTEMS

(71) Applicant: Jimmy Broyles, San Angelo, TX (US)

(72) Inventor: Jimmy Broyles, San Angelo, TX (US)

(*) Notice: Subject to any disclaimer, the term of this patent is extended or adjusted under 35 U.S.C. 154(b) by 329 days.

(21) Appl. No.: 13/732,331

(22) Filed: Dec. 31, 2012

Related U.S. Application Data (60) Provisional application No. 61/583,714, filed on Jan. 6, 2012.

(51) Int. Cl.
*F16B 39/10* (2006.01)
*B25B 27/30* (2006.01)
*B23P 15/18* (2006.01)

(52) U.S. Cl.
CPC ............... *B25B 27/302* (2013.01); *B23P 15/18* (2013.01)

(58) Field of Classification Search
CPC ...... B25B 27/0035; B25B 27/00; B25B 31/00
See application file for complete search history.

(56) References Cited

U.S. PATENT DOCUMENTS

| | | | | |
|---|---|---|---|---|
| 1,300,924 A * | 4/1919 | Bush | | 157/1.1 |
| 2,698,161 A | 12/1954 | Kirby et al. | | |
| 3,641,846 A | 2/1972 | Prial et al. | | |
| 3,680,834 A * | 8/1972 | Holloway | | 254/25 |
| 5,237,729 A * | 8/1993 | Martin | | 29/227 |
| 2007/0199189 A1* | 8/2007 | Butler | | 29/242 |

* cited by examiner

*Primary Examiner* — Lee D Wilson
(74) *Attorney, Agent, or Firm* — R G Patent Consultant; Rachel E. Gilboy; Bruce A. Ley (57) ABSTRACT

An 18 wheeler S-cam brake shoe tool system is a hand tool about 19½ inches in length having a U-shaped fork on one end and an S-offset on the other end. The length of the bar provides a user sufficient leverage as the bar is used to pry against a fulcrum point. The fork at the distal end of the tool and the S-offset at the proximate end are both integral with the bar. The U-shaped fork is used for positively gripping a brake spring while using the rod to pry against a fulcrum point to stretch the spring. The S-offset has a cylindrical end about ½ inch in diameter which inserts into an orifice on the frame of a brake shoe to positively grip the shoe, while using the rod to pry against the stationary S-cam to reposition the joined first and second brake shoes during removal or reinstallation.

19 Claims, 5 Drawing Sheets

18 WHEELER BRAKE SHOE TOOL SYSTEMS

CROSS-REFERENCE TO RELATED APPLICATION

The present applications are related to and claims priority from prior provisional application Ser. No. 61/583,714 filed Jan. 6, 2012 which applications are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

FIELD OF THE INVENTION

The present invention relates generally to the field of hand tools and more specifically relates to an 18 wheeler S-cam brake shoe tool system.

DESCRIPTION OF THE RELATED ART

A drum brake is a brake that uses friction caused by a set of shoes or pads that press against the inner surface of a rotating drum-shaped part called a brake drum. This type of braking system is still used widely on all types of vehicles in the modernized world. The drum brake began its use in 1902 at which time it was mechanically operated. In the mid 1930s hydraulic systems were added to reduce the amount of user force required to operate. The brake pads are arc shaped pads that are either situated horizontally opposite from each other, or vertically opposite from each other, and attach to a backing plate behind the wheel of a vehicle by pins and springs. The brake drum then slides over the shoes. For all practical purposes, the brake shoes somewhat float since they are not rigidly attached to anything. The brake shoes are however attached to each other via stiff springs and are separated by hydraulic pistons to expand the circumference of the two brake shoes within the brake drum. As the brake pads press against the inner circumference of the brake drum, the friction slows or stops the vehicle.

On many smaller vehicles, the shoes are spread apart by the hydraulic pistons and cylinder directly, but on many heavier duty vehicles, trailers, and trucks, the shoes are spread apart by an S-shaped cam with rollers that is rotated by air pressure. As the S-cam approaches "high lobe" the shoes are spread to their widest point. The springs used to hold the shoes together are very stiff and pry bars are most often used to manipulate the springs and shoes to remove the springs when replacing the brake shoes. Common occurrences when using a pry bar during truck brake maintenance tasks is having the bar slip allowing the brake shoes to slam back together. This has caused serious injuries to hands and fingers of many mechanics. While a pry bar is able to apply leverage to spread the shoes or stretch a spring, the smooth surface of a pry bar with no detail for gripping a fulcrum point, spring, or point on a brake shoe increases the likelihood of slipping as the pry angle changes. A tool that makes a positive grip on the spring loaded brake parts to prevent slippage is needed, whereby a mechanic's hands are remote from the brakes providing safety as desired.

Various attempts have been made to solve the above-mentioned problems such as those found in U.S. Pat. Pub. No. 2007/0199189; U.S. Pat. Nos. 3,641,846; 2,698,161; 3,680, 834; 5,237,729; and 1,300,924. This prior art is representative of hand tools for applying leverage. None of the above inventions and patents, taken either singly or in combination, is seen to describe the invention as claimed.

Ideally, a an 18 wheeler S-cam brake shoe tool system should provide efficiency in use, safety, and be user-friendly, and yet, would operate reliably and be manufactured at a modest expense. Thus, a need exists for a reliable 18 wheeler S-cam brake shoe tool system to perform cost-effective brake shoe repairs on 18 wheelers utilizing S-cams with drum brakes and to avoid the above-mentioned problems.

BRIEF SUMMARY OF THE INVENTION

In view of the foregoing disadvantages inherent in the known brake shoe tool art, the present invention provides a novel 18 wheeler S-cam brake shoe tool system. The general purpose of the present invention, which will be described subsequently in greater detail, is to provide speed, safety, and ease of use during brake shoe change-outs.

An 18 wheeler S-cam brake shoe tool system as disclosed herein, in a preferred embodiment, may comprise an S-cam brake shoe tool having a rod with a proximate end terminating in an S-offset, a distal end terminating in a U-shaped fork, and a lever shaft therebetween. The S-offset is preferably integral with the lever shaft and is located on the proximate end of the rod. The S-offset departs from the first plane whereon the rod and the U-shaped fork are located onto a second plane; the second plane conducive to 'turning corners' around the brake shoe(s) to engage an orifice in a brake shoe pad frame for manipulation. The proximate end may comprise a proximate-knurled-grip and is able to provide the user with a (first) non-slip grip. The U-shaped fork is preferably integral with the distal end of the rod. The U-shaped fork is co-linear on a first plane with the rod. The distal end may also comprise a distal-knurled-grip providing the user with a second non-slip grip to prevent any slippage of the hands when using. The lever shaft is located between the S-offset and the U-shaped fork. The S-offset is useful for coupling to a brake shoe and providing leverage to spread the brake shoe(s) such that S-cam roller(s) are able to be installed by a user.

The U-shaped fork is useful for stretching a brake shoe(s) retaining spring such that a shoe retainer pin is able to be installed by the user while the brake shoe(s) are still coupled together by the brake shoe retaining spring. This feature makes the present tool multi-purpose in nature. The S-cam brake shoe tool is useful in reducing installation time and increasing safety for a user during replacement of the old brake shoe(s) with a new set of the brake shoe(s).

The S-cam brake shoe tool comprises a class 1 lever and the lever shaft is a handle for applying force on an opposing end of the shaft (from the fulcrum) multiplying the force at the opposite end from the grip of the user. The S-cam brake shoe tool may be about 19½ inches in length and about a ½ inch in diameter in preferred embodiments. The rod of the S-cam brake shoe tool may comprise a cylindrical cross section along the length of the rod. The rod may comprise ferrous metal but may comprise stainless steel or a combination of tempered metals in alternate embodiments. The rod is constructed to have sufficient rigidity to apply leverage during replacement of the brake shoe(s) without the rod undesirably bending or flexing. The S-offset of the proximate end of the rod is able to securely couple into an orifice in the brake shoe(s) and a fulcrum provided by the S-cam for applying leverage to manipulate installation or removal of the brake shoes. The U-shaped fork of the distal end of the rod is able to securely couple to a brake shoe retaining spring with the fulcrum also provided by the S-cam. The S-cam brake shoe tool is able to prevent the hand of a user from getting hurt since the user's hand is able to be remote from the brake shoe(s) while manipulating the brake shoe(s).

The 18 wheeler S-cam brake shoe tool system further may comprise a kit having at least one S-cam brake shoe tool having a U-shaped fork and an S-offset, and a least one set of user instructions for use in brake shoe installations and maintenance. A method of use for the 18 wheeler S-cam brake shoe tool system may comprise the steps of removing a wheel off of a truck to expose a first set of brake shoe(s), inserting a U-shaped fork of an S-cam brake shoe tool onto a first brake shoe(s) retaining spring to uncouple a first end of the first set of brake shoe(s) from each other, inserting the U-shaped fork onto a second brake shoe(s) retaining spring to uncouple the second end of the first set of brake shoe(s) from each other, removing a top and a bottom retainer pin, removing the first set of brake shoes from a backing plate, inserting the top and the bottom retainer pins through a second set of brake shoes to attach to the backing plate, inserting the U-shaped fork to pry-install the first brake shoe(s) retaining spring and the second brake shoe(s) retaining spring, inserting the S-offset of the S-cam brake shoe tool to pry-install at least one S-cam roller between an S-cam and at least one end of the second set of brake shoe(s), and re-installing the wheel of the truck. Double-checking of the brake installation is recommended before driving occurs for safety reasons.

The present invention holds significant improvements and serves as an 18 wheeler S-cam brake shoe tool system. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, 18 wheeler S-cam brake shoe tool systems, constructed and operative according to the teachings of the present invention.

The various embodiments of the present invention will hereinafter be described in conjunction with the appended drawings, wherein like designations denote like elements.

DETAILED DESCRIPTION

As discussed above, embodiments of the present invention relate to brake shoe tool device and more particularly to an 18 wheeler S-cam brake shoe tool system as used to improve the speed, safety, and ease of use during brake shoe 'change-outs'.

Generally speaking, the 18 wheeler S-cam brake shoe tool system is a hand tool about 19½ inches in length having a U-shaped fork on one end and an S-offset on the other end. The length of the bar provides a user with sufficient leverage as the bar is used to pry against a fulcrum point. The fork at the distal end of the tool and the S-offset at the proximate end are both integral with the bar in preferred embodiments however alternate versions may comprise the ends being welded onto the shaft. The U-shaped fork is used for positively gripping a brake spring while using the rod or shaft to pry against a fulcrum point to stretch the spring. The S-offset has a cylindrical end about 7/16 inch in diameter which inserts into an orifice on the frame of a brake shoe to positively grip the shoe, while using the rod to pry against the stationary S-cam to reposition the joined first and second brake shoes. The present invention is useful to increase cost-efficiency of brake changes on large vehicles.

Figure 1:
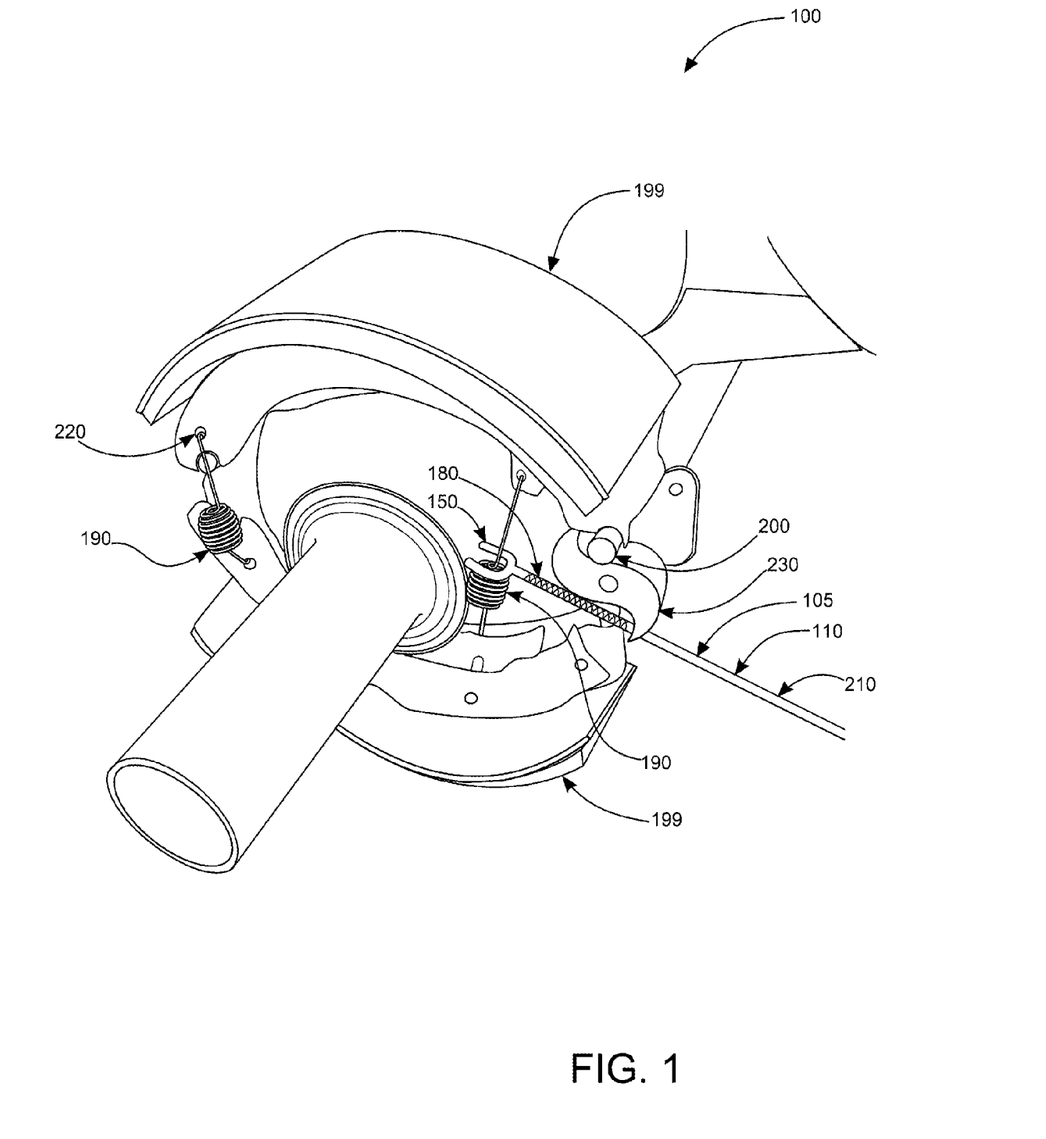
FIG. 1 shows a perspective view illustrating an in-use condition of an 18 wheeler S-cam brake shoe tool system according to an embodiment of the present invention.

Referring now to the drawings by numerals of reference there is shown in FIG. 1, a perspective view illustrating an in-use condition of 18 wheeler S-cam brake shoe tool system 100 according to an embodiment of the present invention.

18 wheeler S-cam brake shoe tool system 100 may comprise S-cam brake shoe tool 105 having rod 110 with proximate end 120 terminating in S-offset 130, distal end 140 terminating in U-shaped fork 150, and lever shaft 160 therebetween. Proximate end 120 may comprise proximate-knurled-grip 170 and as such is able to provide a user with a (first) non-slip grip. Distal end 140 may also comprise distal-knurled-grip 180 providing the user with a second non-slip grip. U-shaped fork 150 is preferably integral with distal end 140 of rod 110 and is co-linear on the first plane with rod 110. Lever shaft 160 is located between S-offset 130 and U-shaped fork 150. U-shaped fork 150 is useful for stretching brake shoe(s) retaining spring 190 such that a shoe retainer pin is able to be installed by a user while brake shoe(s) 199 are still coupled together by brake shoe(s) retaining spring 190.

Figure 2:
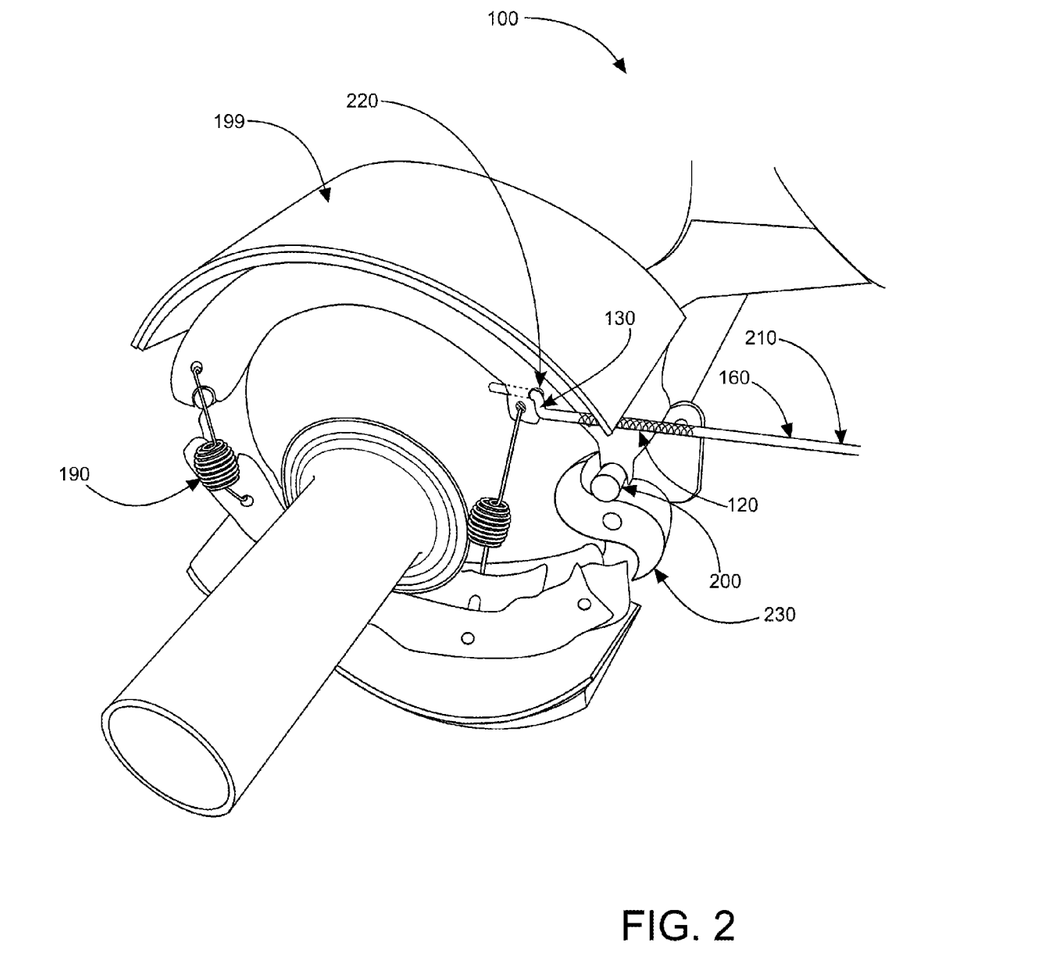
FIG. 2 is a second perspective view illustrating an in-use condition of the 18 wheeler S-cam brake shoe tool system according to an embodiment of the present invention of FIG. 1.

Referring now to FIG. 2, a second perspective view illustrating an in-use condition of 18 wheeler S-cam brake shoe tool system 100 according to an embodiment of the present invention of FIG. 1.

S-offset 130 is also preferably integral with lever shaft 160 and is located on proximate end 120 of rod 110. S-offset 130 departs from a first plane (whereon rod 110 and U-shaped fork 150 are located) onto a second plane, the second plane conducive to 'turning corners' around brake shoe(s) 199 to engage an orifice in brake shoe(s) 199 pad frame, as shown in the present FIG. 2. S-offset 130 is useful for coupling to a brake shoe(s) 199 and providing leverage to spread brake shoe(s) 199 such that S-cam roller(s) 200 are able to be installed by a user. S-cam brake shoe tool 105 is useful in reducing installation time and increasing safety for a user during the replacement of old brake shoe(s) 199 with a new set of brake shoe(s) 199. Thus, the present device is cost-effective in use.

Figure 3:
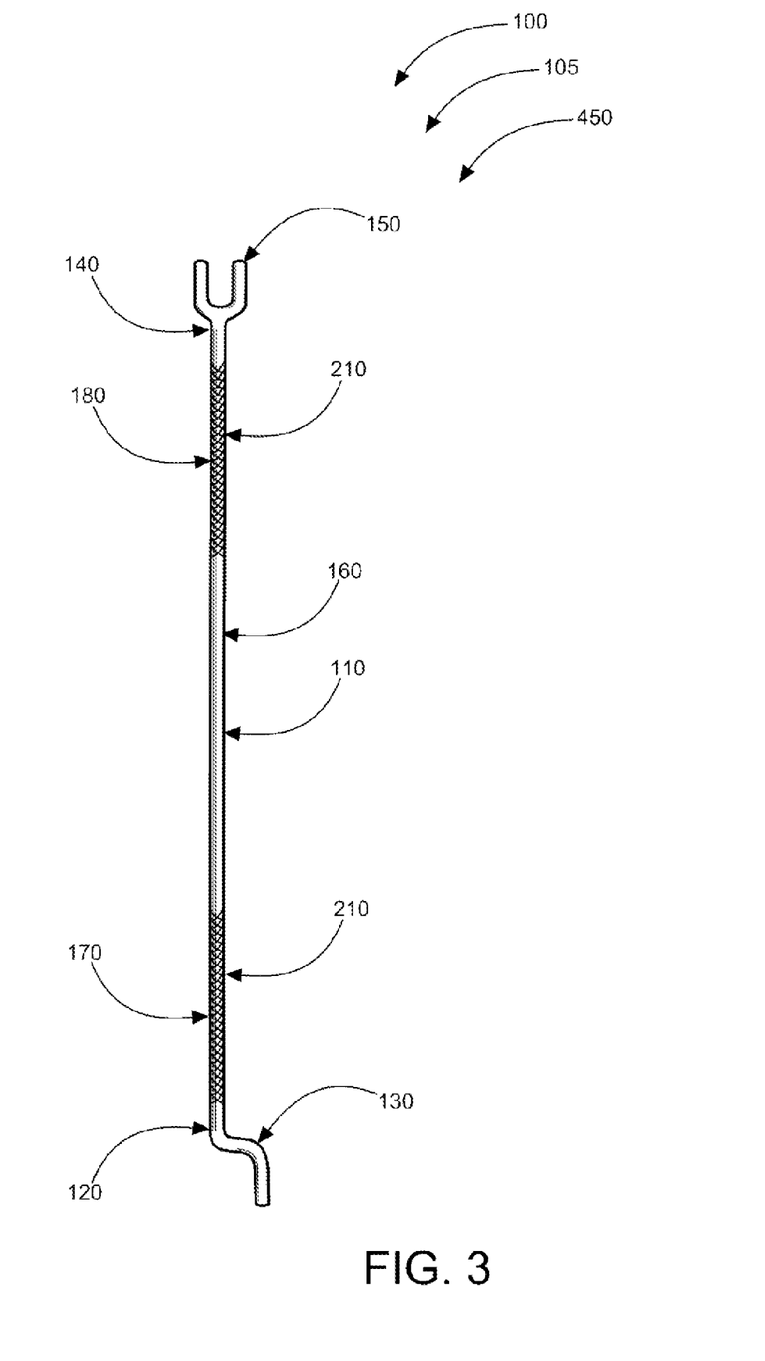
FIG. 3 is a perspective view illustrating the 18 wheeler S-cam brake shoe tool according to an embodiment of the present invention of FIG. 1.

Referring now to FIG. 3, a perspective view illustrating 18 wheeler S-cam brake shoe tool 105 according to an embodiment of the present invention of FIG. 1.

S-cam brake shoe tool 105 is a class 1 lever and lever shaft 160 comprises handle 210 for applying force on an opposing end of rod 110 from a fulcrum, thereby enabling multiplying the force at the opposite end from the grip of a user. S-cam brake shoe tool 105 may be about 19½ inches in length and about a ½ inch in diameter but may be longer or shorter, and larger or smaller in diameter in other embodiments. Rod 110 of S-cam brake shoe tool 105 may comprise a cylindrical cross section length of rod 110. Rod 110 may comprise ferrous metal but may comprise stainless steel or a combination of tempered metals in some embodiments. Rod 110 is constructed to have sufficient rigidity to apply leverage during replacement of brake shoe(s) 199 without bending or flexing significantly. S-offset 130 of proximate end 120 of rod 110 is able to securely couple into orifice 220 in brake shoe(s) 199 and a fulcrum provided by S-cam 230 for applying leverage to manipulate installation or removal of brake shoe(s) 199.

Figure 4:
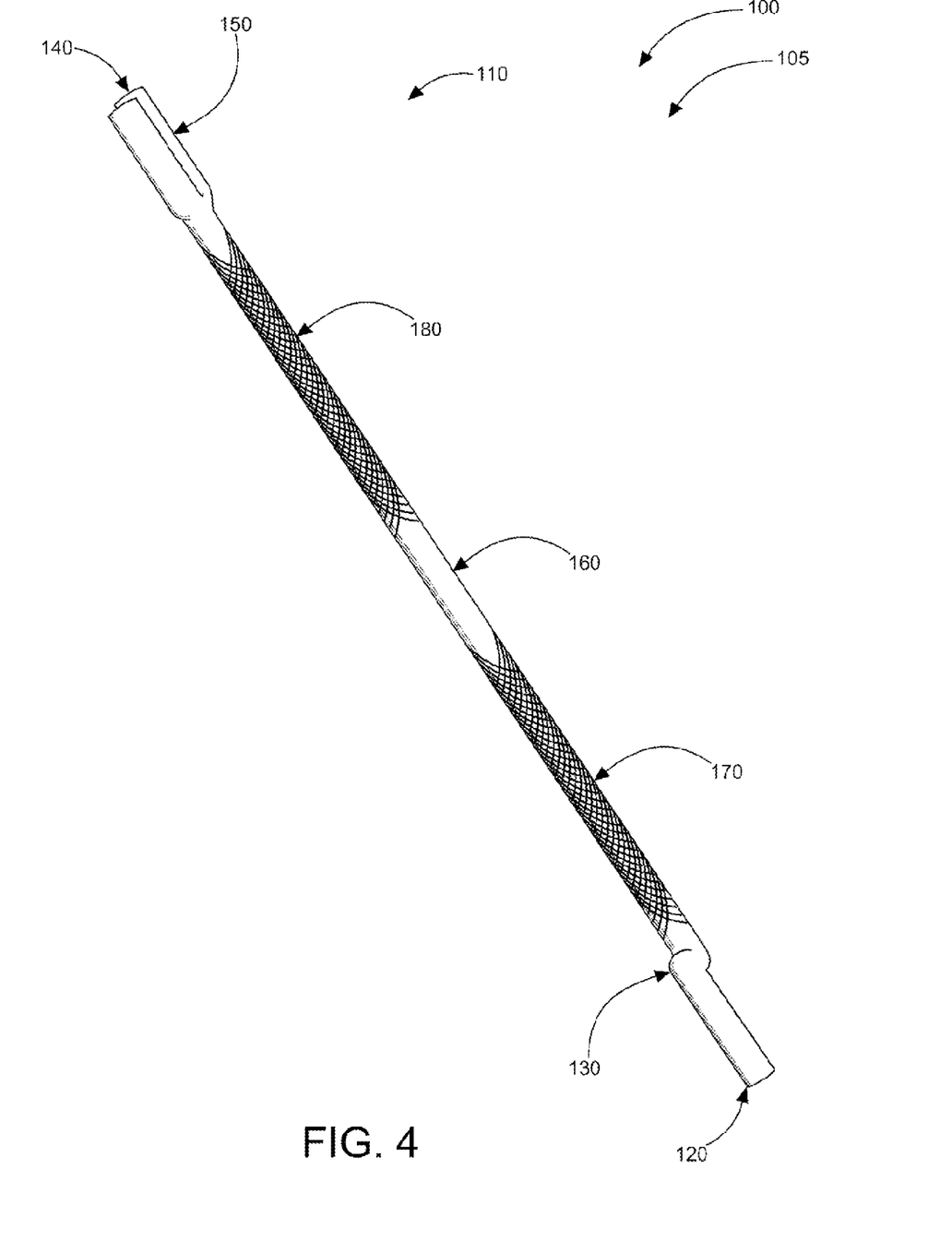
FIG. 4 is another perspective view illustrating the 18 wheeler S-cam brake shoe tool system according to an embodiment of the present invention of FIG. 1.

Referring now to FIG. 4, another perspective view illustrating 18 wheeler S-cam brake shoe tool system 100 according to an embodiment of the present invention of FIG. 1.

U-shaped fork 150 of distal end 140 of rod 110 is able to securely couple to brake shoe(s) retaining spring 190 with a fulcrum also provided by S-cam 230. S-cam brake shoe tool 105 is able to prevent the hand of a user from becoming injured by 'smashes' or 'pinching' since the user's hand is able to be remotely located from brake shoe(s) 199 while being manipulated using S-cam brake shoe tool 105 during use of the tool for leverage. U-shaped fork 150 has a spacing between the tines that does not allow the spring portion of brake shoe(s) retaining spring 190 to pass there between. U-shaped fork 150 is used by placing a multiplied downward force onto the spring portion of brake shoe(s) retaining spring 190 during a maintenance procedure.

18 wheeler S-cam brake shoe tool systems 100 according to an embodiment of the present invention of FIGS. 1-4, may be sold as kit 450 comprising the following parts: at least one S-cam brake shoe tool 105 having U-shaped fork 150 and S-offset 130, and at least one set of user instructions for use in brake shoe(s) 199 installations and maintenance. 18 wheeler S-cam brake shoe tool systems 100 may be manufactured and provided for sale in a wide variety of sizes and shapes for a wide assortment of applications. Upon reading this specification, it should be appreciated that, under appropriate circumstances, considering such issues as design preference, user preferences, marketing preferences, cost, structural requirements, available materials, technological advances, etc., other kit contents or arrangements such as, for example, including more or less components, customized parts, different material combinations, ends may be angled at different orientations, etc., may be sufficient.

Figure 5:
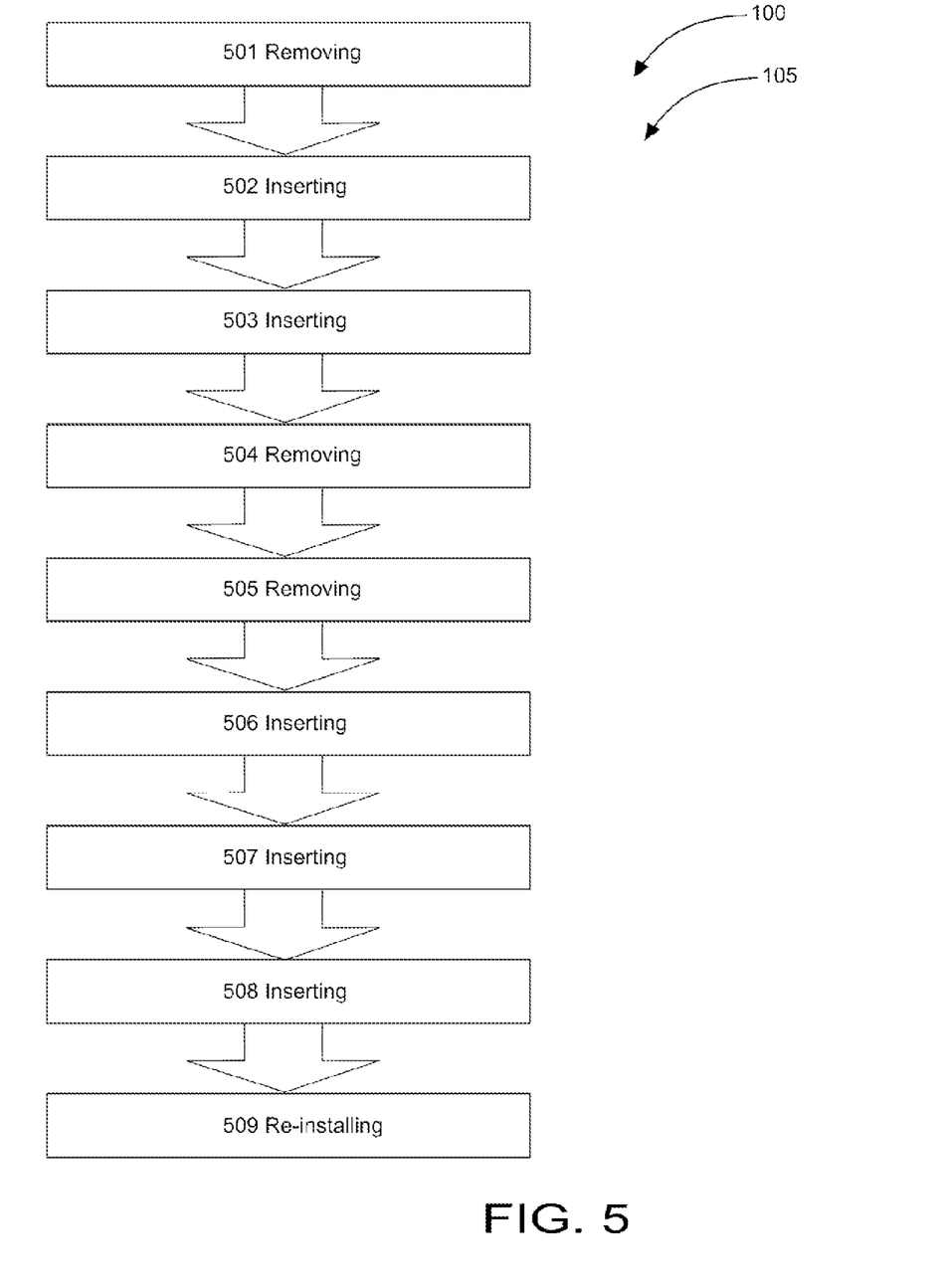
FIG. 5 is a flowchart illustrating a method of use of the 18 wheeler S-cam brake shoe tool system according to an embodiment of the present invention of FIGS. 1-4.

Referring now to FIG. 5, showing a flowchart illustrating a method of use 500 for 18 wheeler S-cam brake shoe tool system 100 according to an embodiment of the present invention of FIGS. 1-4.

A method of use for 18 wheeler S-cam brake shoe tool system 100 may comprise the steps of: step one 501, removing a wheel and drum off of a truck to expose a first set of brake shoe(s) 199; step two 502 inserting U-shaped fork 150 of S-cam brake shoe tool 105 onto brake shoe(s) retaining spring 190 to uncouple the first end of the first set of brake shoe(s) 199 from each other; step three 503 inserting U-shaped fork 150 onto a second brake shoe(s) retaining spring 190 to uncouple the second end of the first set of brake shoe(s) 199 from each other; step four 504 removing the top and bottom retainer pins holding the brake shoe(s) 199 to the backing plate; step five 505 removing the first set of brake shoe(s) 199 from the backing plate; and step six 506 inserting the top and the bottom retainer pins through a second set of brake shoe(s) 199 to attach to the backing plate; step seven 507 inserting U-shaped fork 150 to pry-install the first brake shoe(s) retaining spring 190 and the second brake shoe(s) retaining spring 190; step eight 508 inserting S-offset 130 of the S-cam brake shoe tool 105 to pry-install at least one S-cam roller(s) 200 between S-cam 230 and at least one end of the second set of brake shoe(s) 199; step nine 509 and re-installing the wheel of the truck. Those with ordinary skill in the art will now appreciate that upon reading this specification and by their understanding the art of brake maintenance as described herein, the steps of method 500 will be understood by those knowledgeable in such art.

It should be noted that the steps described in the method of use can be carried out in many different orders according to user preference. Upon reading this specification, it should be appreciated that, under appropriate circumstances, considering such issues as design preference, user preferences, marketing preferences, cost, structural requirements, available materials, technological advances, etc., other methods of use arrangements such as, for example, different orders within above-mentioned list, elimination or addition of certain steps, including or excluding certain maintenance steps, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. An 18 wheeler S-cam brake shoe tool system comprising:
    an S-cam brake shoe tool comprising;
        a rod comprising;
            a proximate end terminating in an S-offset;
            a distal end terminating in a U-shaped fork; and
        a lever shaft;
    wherein said S-offset is integral with said lever shaft and is located on said proximate end of said rod;
    wherein said U-shaped fork is integral with said distal end of said rod;
    wherein said lever shaft is located between said S-offset and said U-shaped fork;

wherein said S-offset is useful for coupling to a brake shoe and providing leverage to spread said brake shoe(s) such that S-cam roller(s) are able to be installed by a user;

wherein said U-shaped fork is useful for stretching a brake shoe(s) retaining spring such that a shoe retainer pin is able to be installed by said user while said brake shoe(s) are still coupled together by said brake shoe retaining spring; and wherein said S-cam brake shoe tool is useful to reduce installation time and increase safety of said user during a replacement of said brake shoe(s) with a new set of said brake shoe(s).

2. The 18 wheeler S-cam brake shoe tool system of claim 1 wherein said S-cam brake shoe tool comprises a class 1 lever.

3. The 18 wheeler S-cam brake shoe tool system of claim 2 wherein said S-offset of said proximate end of said rod is able to securely couple into an orifice in said brake shoe(s), a fulcrum provided by an S-cam.

4. The 18 wheeler S-cam brake shoe tool system of claim 1 wherein said proximate end comprises a proximate-knurled-grip.

5. The 18 wheeler S-cam brake shoe tool system of claim 1 wherein said distal end comprises a distal-knurled-grip.

6. The 18 wheeler S-cam brake shoe tool system of claim 3 wherein said U-shaped fork of said distal end of said rod is able to securely couple to a brake shoe retaining spring, said fulcrum provided by said S-cam.

7. The 18 wheeler S-cam brake shoe tool system of claim 2 wherein said S-cam brake shoe tool is about 19½ inches in length.

8. The 18 wheeler S-cam brake shoe tool system of claim 7 wherein said rod of said S-cam brake shoe tool comprises a cylindrical cross section about a length of said rod.

9. The 18 wheeler S-cam brake shoe tool system of claim 8 wherein said rod comprises ferrous metal.

10. The 18 wheeler S-cam brake shoe tool system of claim 9 wherein said rod comprises stainless steel.

11. The 18 wheeler S-cam brake shoe tool system of claim 10 wherein said rod comprises sufficient rigidity to apply leverage during a replacement of said brake shoe(s) without said rod bending significantly.

12. The 18 wheeler S-cam brake shoe tool system of claim 1 wherein said S-cam brake shoe tool prevents a hand of said user from getting hurt since said hand is able to be remote from said brake shoe(s) while manipulating said brake shoe(s).

13. The 18 wheeler S-cam brake shoe tool system of claim 3 wherein said U-shaped fork is co-linear on a first plane with said rod.

14. The 18 wheeler S-cam brake shoe tool system of claim 13 wherein said S-offset departs from said first plane whereon said rod and said U-shaped fork are located onto a second plane, said second plane conducive to turning corners around said brake shoe(s) to engage said orifice.

15. The 18 wheeler S-cam brake shoe tool system of claim 4 wherein said proximate-knurled-grip of said proximate end of said rod is able to provide said user with a non-slip grip.

16. The 18 wheeler S-cam brake shoe tool system of claim 5 wherein said distal-knurled-grip of said distal end of said rod is able to provide said user with a non-slip grip.

17. The 18 wheeler S-cam brake shoe tool system of claim 1 wherein said lever shaft comprises a handle for applying force on an opposing end to said fulcrum, said force multiplied at an opposite end to a grip of said user.

18. An 18 wheeler S-cam brake shoe tool system comprising:
an S-cam brake shoe tool comprising;
a rod comprising;
a proximate end terminating in an S-offset;
a distal end terminating in a U-shaped fork; and
a lever shaft;

wherein said S-offset is integral with said lever shaft and is located on said proximate end of said rod;

wherein said S-offset departs from said first plane whereon said rod and said U-shaped fork are located onto a second plane, said second plane conducive to turning corners around said brake shoe(s) to engage an orifice;

wherein said proximate end comprises a proximate-knurled-grip;

wherein said proximate-knurled-grip of said proximate end of said rod is able to provide said user with a first non-slip grip;

wherein said U-shaped fork is integral with said distal end of said rod;

wherein said U-shaped fork is co-linear on a first plane with said rod;

wherein said distal end comprises a distal-knurled-grip;

wherein said distal-knurled-grip of said distal end of said rod is able to provide said user with a second non-slip grip;

wherein said lever shaft is located between said S-offset and said U-shaped fork;

wherein said S-offset is useful for coupling to a brake shoe and providing leverage to spread said brake shoe(s) such that S-cam roller(s) are able to be installed by a user;

wherein said U-shaped fork is useful for stretching a brake shoe(s) retaining spring such that a shoe retainer pin is able to be installed by said user while said brake shoe(s) are still coupled together by said brake shoe retaining spring;

wherein said S-cam brake shoe tool is useful to reduce installation time and increase safety of said user during a replacement of said brake shoe(s) with a replacement set of said brake shoe(s);

wherein said S-cam brake shoe tool is a class 1 lever;

wherein said lever shaft comprises a handle for applying force on an opposing end to said fulcrum, said force multiplied at an opposite end to a grip of said user;

wherein said S-cam brake shoe tool is about 19½ inches in length;

wherein said rod of said S-cam brake shoe tool comprises a cylindrical cross section about a length of said rod;

wherein said rod comprises ferrous metal;

wherein said rod comprises stainless steel;

wherein said rod comprises sufficient rigidity to apply leverage during a replacement of said brake shoe(s) without said rod bending significantly;

wherein said S-offset of said proximate end of said rod is able to securely couple into said orifice in said brake shoe(s), a fulcrum provided by an S-cam;

wherein said U-shaped fork of said distal end of said rod is able to securely couple to a brake shoe retaining spring, said fulcrum provided by said S-cam; and wherein said S-cam brake shoe tool prevents a hand of said user from getting hurt since said hand is able to be remote from said brake shoe(s) while manipulating said brake shoe(s).

19. The 18 wheeler S-cam brake shoe tool system of claim 18 further comprising a kit having:
at least one said s-cam brake shoe tool having said u-shaped fork and said s-offset; and at least one set of user instructions for use in brake shoe installations and maintenance.

* * * * *